United States Patent [19]

Graham

[11] Patent Number: 4,600,982

[45] Date of Patent: Jul. 15, 1986

[54] LOW POWER CONSUMING AC TO DC CONVERTER

[75] Inventor: Martin H. Graham, Berkeley, Calif.

[73] Assignee: Rolm Corporation, Santa Clara, Calif.

[21] Appl. No.: 742,893

[22] Filed: Jun. 10, 1985

Related U.S. Application Data

[62] Division of Ser. No. 582,612, Feb. 22, 1984, abandoned.

[51] Int. Cl.$^4$ ............................................. H02M 7/17
[52] U.S. Cl. ...................... 363/61; 363/70; 363/128; 323/272
[58] Field of Search ............... 323/266, 268, 271, 272; 363/61, 70, 86, 89, 126, 128, 129

[56] References Cited

U.S. PATENT DOCUMENTS

| | | | |
|---|---|---|---|
| 3,001,120 | 9/1961 | Bereskin | 363/126 |
| 3,412,314 | 11/1968 | Crane | 363/86 |
| 3,868,562 | 2/1975 | Marshall | 363/86 |
| 3,978,388 | 8/1976 | de Vries | 363/53 |
| 4,127,895 | 11/1978 | Krueger | 363/89 |
| 4,245,294 | 1/1981 | Brolin | 363/126 |
| 4,258,309 | 3/1981 | Ohsaka et al. | 323/271 |

FOREIGN PATENT DOCUMENTS

| | | | |
|---|---|---|---|
| 589677 | 1/1978 | U.S.S.R. | 363/128 |

OTHER PUBLICATIONS

Singer et al., "Power Regulation by means of a Switched Capacitor", Proc. IEE, vol. 119, No. 2, Feb. 1972, pp. 149–152.

Banthorpe, ". . . A Low Voltage Power Supply", Practical Electronics, Nov. 1975, vol. 11, No. 11, pp. 914–916.

Thom, "Capacitor Drops Voltage with Little Heat for Low Cost, Low Voltage Power Supply", Electronic Design, Nov. 22, 1975, p. 148.

Primary Examiner—William H. Beha, Jr.
Assistant Examiner—Jeffrey Sterrett
Attorney, Agent, or Firm—Blakely, Sokoloff, Taylor & Zafman

[57] ABSTRACT

A circuit for converting an AC potential to a regulated DC potential which circuit consumes a minimum of power and is relatively inexpensive to build is described. A capacitor is used to couple the AC potential to a rectifier. The duration of current flow through the capacitor is controlled to obtain the regulation. An on or off switching device is used such as an SCR, eliminating the current flow regulation devices often used in regulative power supplies. The invented circuit is particularly useful for providing a regulated DC potential in a switching power supply.

4 Claims, 5 Drawing Figures

LOW POWER CONSUMING AC TO DC CONVERTER

This is a divisional of application Ser. No. 582,612 filed Feb. 22, 1984, now abandoned.

BACKGROUND OF THE INVENTION

1. Field of the Invention

The invention relates to AC to DC power conversion, particularly where the DC potential is regulated.

2. Prior Art

There are countless circuits for receiving an AC potential such as a 60 Hz power source, and converting it to a regulated DC potential. Often, the DC current flow to the load is controlled to provide regulation. For instance, a transistor may be coupled in series with the load and the flow of current through this transistor is controlled to regulate the DC potential. In such circuits, the transistor consumes relatively large amounts of power and are often expensive devices. As will be seen, the present invention uses a capacitor and switch to provide regulation without substantial power consumption.

Switching power supplies employing a switching transformer are commonly used to provide a regulated DC potential for integrated circuits. Typically, the 60 Hz line potential is converted to a DC potential by a rectifier and this DC potential is switched at a much high frequency through a transformer. This switching is controlled causing a regulated potential on the secondary windings of the transformer which, after rectification, provides the regulated DC potential (e.g., 5 volts for integrated circuits). See U.S. Pat. No. 4,347,559 for one such power supply. The DC potential which is switched at the primary winding, is typically unregulated. To provide regulation of this DC potential for the switching power supply is quite expensive and not used. Transformers needed at 60 cycles for this regulation and/or isolation are large, and hence, costly. The present invention is particularly useful in a switching power supply to control the DC voltage on the primary winding of the transformer.

In the prior art there are power supplies which utilize capacitors in series with or in connection with rectifiers, but these circuits do not use the switching means of the present invention to provide regulation through the capacitor. One such prior art circuit is shown in U.S. Pat. No. 3,001,120. Other prior art circuits showing capacitors and inductors used in conjunction with rectifiers, but in a different manner than the present invention, are U.S. Pat. Nos. 3,978,388; 4,245,294; and 4,322,787. U.S. Pat. No. 3,324,378 illustrates switching in conjunction with a rectifier but no series capacitors.

SUMMARY OF THE INVENTION

An improvement in an electrical circuit which receives an AC potential and converts it to a DC potential is described. The improvement includes the use of at least one capacitor which is coupled to receive the AC potential. A switching means which provides an on/off switch is used to control the duration of current flow through the capacitor, and thereby regulates the DC potential. A control means which for instance senses the DC potential, controls the switching means. Since the switching means operates as an on or off switch, very little power is consumed by the switching means. In one embodiment, the switching means comprises a transistor which is turned on when the current flow is very low and is turned off when the transistor is in saturation. In another embodiment, a plurality of SCRs are employed, each of which are coupled to a capacitor. By controlling the number of SCRs which are triggered during each AC cycle, the output DC potential is regulated.

DETAILED DESCRIPTION OF THE INVENTION

A circuit is described for converting an alternating current (AC) potential to a direct current (DC) potential. In the following description, numerous specific details such as specific connections are shown to provide a thorough understanding of the present invention. It will be obvious, however, to one skilled in the art that the present invention may be practiced without these specific details.

In one currently preferred embodiment, the invention is used to convert a standard 60 Hz power source potential (e.g., 120 volts) to a DC potential (e.g., 100 volts.) The invented circuit provides best results when the magnitude of the AC potential (rms value) is not substantially different than the DC potential. In its preferred use, the circuit is used to provide a regulated DC potential for the primary winding in a switching power supply. Switching power supplies are well known and often used to provide power for integrated circuits. The present invention is ideal for this application since it provides regulation of the DC potential without the use of transformers, without expensive components and without significant power dissipation.

Figure 1:
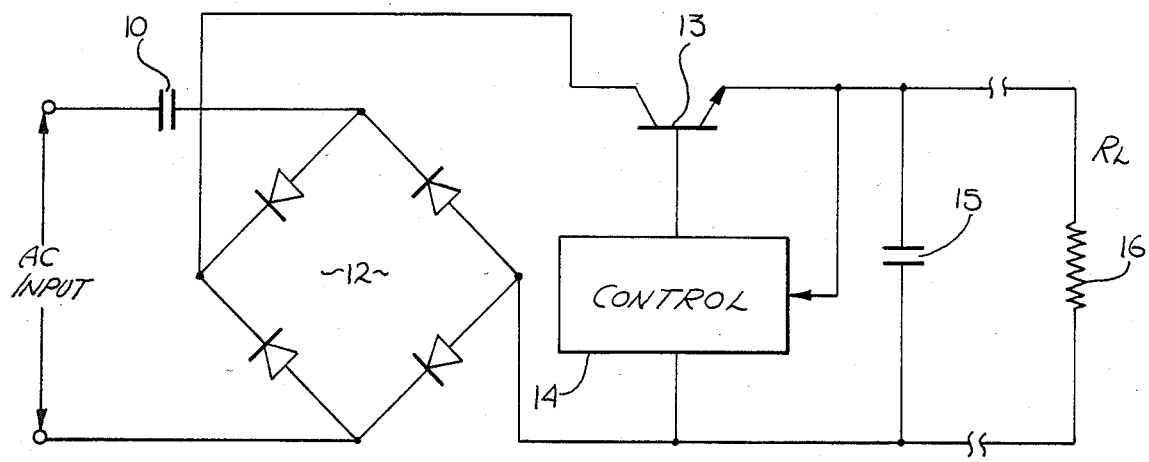
FIG. 1 is an electrical schematic showing one embodiment of the present invention.

Referring first to FIG. 1, the AC (input) potential is applied to the full wave rectifier 12 through a series capacitor 10. The DC potential from the full wave rectifier is coupled to a filtering capacitor 15 through a transistor 13. The regulated DC potential on capacitor 15 is generally coupled across a load illustrated as resistor 16 in FIG. 1. This load, in practice, may be the primary winding in a switching power supply.

The transistor 13 operates as a switch; that is, it is either on or off. (It therefore does not operate as a variable resistor as do many transistors in DC regulator circuits.) The transistor 13 controls the duration of the current flow through the capacitor 10. In fact, a switch may be connected directly to the capacitor 10 to control the current flow. However, the switch would need to switch current in both directions. With the switch 13 on the DC side of the rectifier, bidirectional switching is not needed and therefore a single transistor can be used.

To understand the regulation provided by the circuit of FIG. 1, assume for a moment that the capacitance of capacitor 10 is zero, then the DC potential at transistor 13 is not reduced. On the other hand, if the capacitance of capacitor 10 is infinite, there is no output from the rectifier 12. For capacitances between these extremes, different reductions in DC potential can be obtained. Thus, by adjusting the capacitance of capacitor 10, regulation can be achieved. With the present invention, the capacitance of the capacitor, in effect, is adjusted by adjusting the duration of the current flow through the capacitor. This current flow is controlled through the transistor 13.

Figure 2:
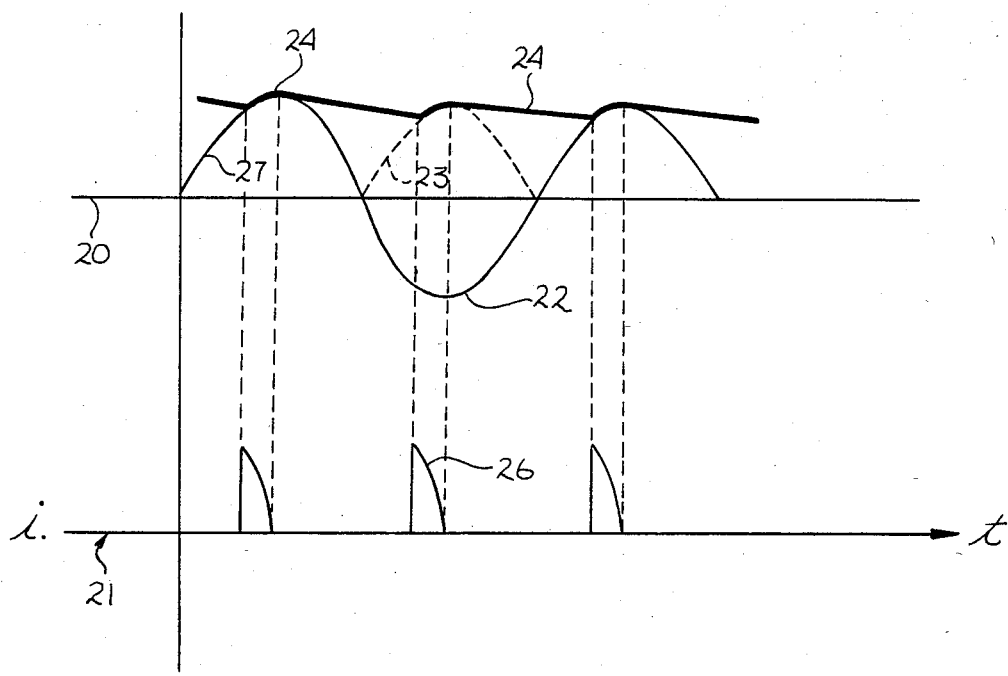
FIG. 2 are waveforms used to describe the operation of the circuit of FIG. 1.

Referring to FIG. 2, and the waveforms shown on line 20, waveform 22 represents the typical AC waveform applied to the rectifier 12. At the output of the fullwave rectifier the negative portion of the waveform is represented by the waveform 23. The current flow from the fullwave rectifier to a filter capacitor such as capacitor 15 is represented by the heavier lines 24, absent the present invention.

The current flow through the transistor 13 with the present invention is shown along line 21. It is referenced to the waveforms shown on line 20 for purposes of discussion. In the present invention, the control 14 permits transistor 13 to conduct as soon as there is sufficient potential across the transistor for conduction. This assures that there are no spikes or surges of current through the transistor 13 when it is turned on. The transistor 13 is turned-off only after it is in saturation, preventing any stressful conditions on the transistor. The typical current waveform for the transistor is shown by waveforms 26 in FIG. 2. The period of conduction 27 is varied to provide a regulated DC potential at resistor 16.

The control 14 may employ any one of numerous well known circuits. For instance, control means 14 may simply compare the potential on capacitor 15 with a referenced potential and when the potential on capacitor 15 reaches the reference potential, transistor 13 is switched off. As discussed above, transistor 13 is switched on during the beginning of each half cycle to prevent current surges. In practice, an examination of actual waveforms shows that there is asymmetry in the conduction between the half cycle waveforms of each full cycle. This asymmetry can be eliminated, if desired, by controlling the conduction interval for the positive and negative half cycle differentially so as, for instance, to make the DC voltage across capacitor 10 equal to zero. Other control means are discussed later in this application.

Figure 3:
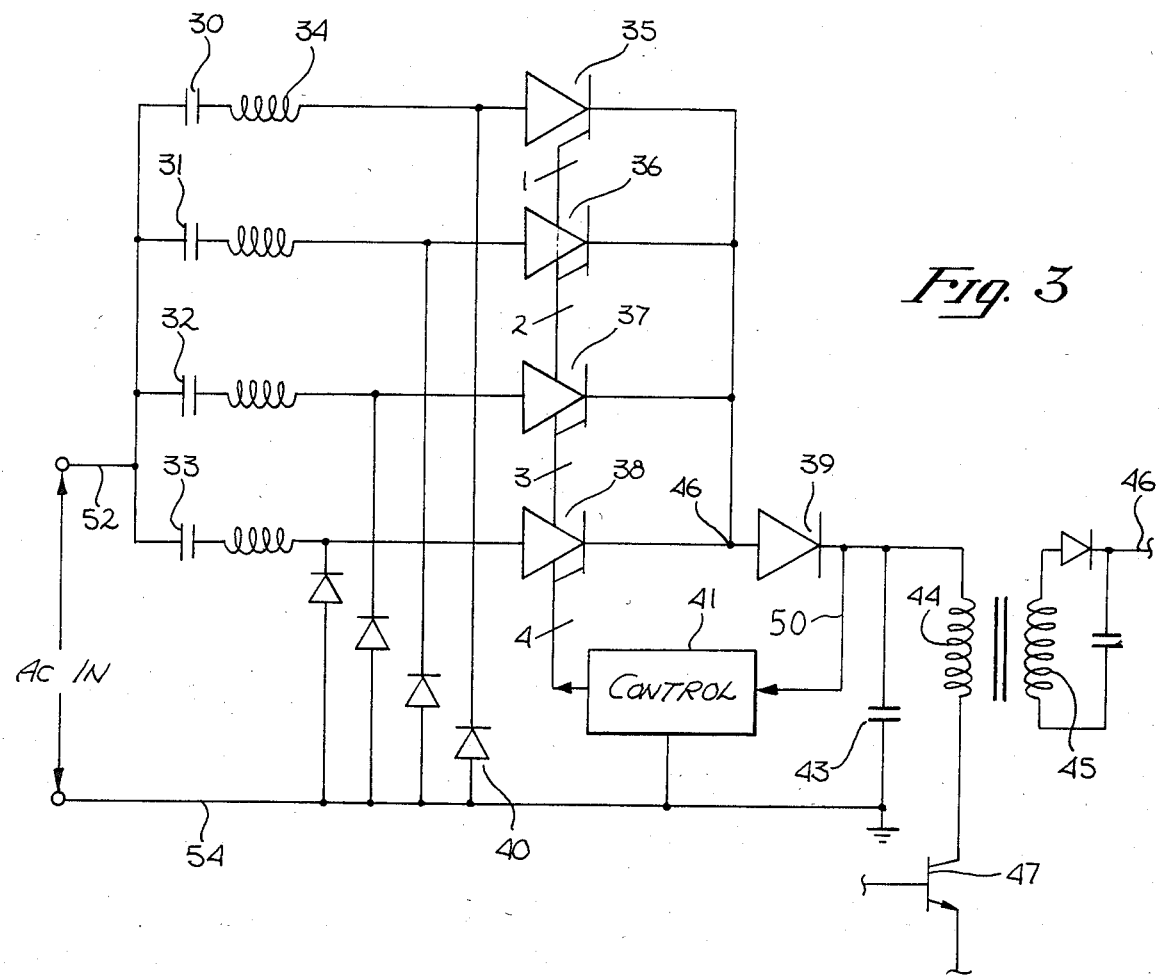
FIG. 3 is an electrical schematic of another embodiment of the present invention where a plurality of separate paths are used, each of which includes a silicon controlled rectifier.
Figure 4:
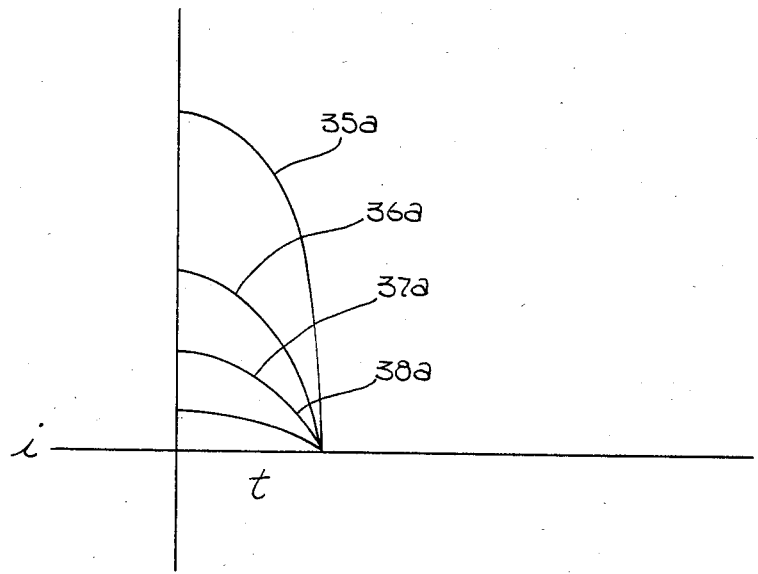
FIG. 4 are current waveforms used to describe the operation of the circuit of FIG. 3.

Referring to FIG. 3, in this embodiment, the capacitors are in series with the switches. In FIG. 4, a plurality of parallel paths are illustrated each of which includes a capacitor, inductor and silicon control rectifier (SCR). The AC potential is applied for the illustrated embodiment to four parallel paths each of which includes a capacitor such as capacitor 30, an inductor such as inductor 34, and a silicon control rectifier such as SCR 35. The output of the rectifiers are coupled to a common node 46. This node is coupled through diode 39 to a filter capacitor 43. The control leads of the SCRs 35, 36, 37, and 38 are each coupled to a control means 41. A diode couples each of the SCRs to ground such as diode 40. These diodes charge the capacitors 30, 31, 32, and 33 during the negative going portion of the input waveform. This circuit is a regulated voltage doubler, and DC voltage is substantially two times the AC RMS input voltage. For the embodiment of FIG. 3, the filter capacitor 43 is shown connected to the primary winding 44 of a transformer which is part of a switching power supply. As is typically the case, current is pulsed through the transformer at a relatively high frequency by a transistor such as transistor 47. On the secondary side of the transformer, the winding 45 is coupled through a diode to provide a DC potential on line 46.

The SCRs are either on or off, thus they perform a switching function although they cannot be turned-off while conducting. It is a characteristic of SCRs that they cannot be turned-off once they begin conducting unless the current through the devices has been substantially reduced to zero. Consequently, unlike for the embodiment of FIG. 1, the interval of conduction cannot be changed. Rather, in FIG. 3, the number of SCRs that is triggered during each cycle determines the current flow to the capacitor 43 and hence, provides the regulation. Therefore, the control means 41 is able to trigger one or more of the SCRs. In the presently preferred embodiment, the capacitance of the capacitors 30, 31, 32, and 33 is binary weighted; the capacitance of the capacitors is proportional to 8, 4, 2, and 1, respectively. In this manner, "fine tuning" of current flow to the load is possible.

Inductors such as inductor 34 can be included in series with the capacitors as shown. These inductors improve the power factor of the circuit, that is, they minimize the otherwise heavy capacitance loading associated with the capacitors 30-33. (They also can be used to shift the zero current point to the SCRs.)

In FIG. 4, the waveforms for current flow through the SCRs is shown. The letter "a" has been added to the number for each of the SCRs to relate the current flow to its respective SCR. Thus, for instance, the current flow through SCR 35 is shown as 35a, and this current flow is substantially larger than the current flow through SCR 38 which current flow is represented by waveform 38a since the capacitance of capacitor 30 is substantially larger than the capacitance of capacitor 33.

Once again, a relatively simple control means may be employed. For example, the potential on capacitor 43 can be compared with a referenced potential. If the referenced potential exceeds the potential on capacitor 43 by a relatively small amount, then only a single SCR such as SCR 38 is triggered. On the other hand, if the difference between these potentials is substantial, then all of the SCRs can be triggered. As was the case with the embodiment of FIG. 1, those SCRs which are to be triggered during each positive half cycle, are permitted to conduct when the potential across the SCR is low. In this manner, current surges are avoided.

It has been found that sensing and utilizing the AC line potential for controlling SCR triggering is particularly useful for a switching power supply. This is done by first assuming that there is a full load on the switching power supply (e.g., line 46). For this full load, the amount of charge needed on capacitor 43 and the potential which should exist on capacitor 43 to provide this charge is known since the capacitance of capacitor 43 is a known quantity ($V = Q/C$). The actual voltage on the capacitor 43 is compared with the needed voltage and the difference between these voltages determines the amount of charge which must be placed on capacitor 43 during each cycle. From this, the SCRs which should conduct is easily determined. In making this determination, however, consideration is given to the AC line potential. Consequently, if the line potential drops, more SCRs may be required to conduct than if the line potential is high. A simple analog circuit is used to provide this control.

Figure 5:
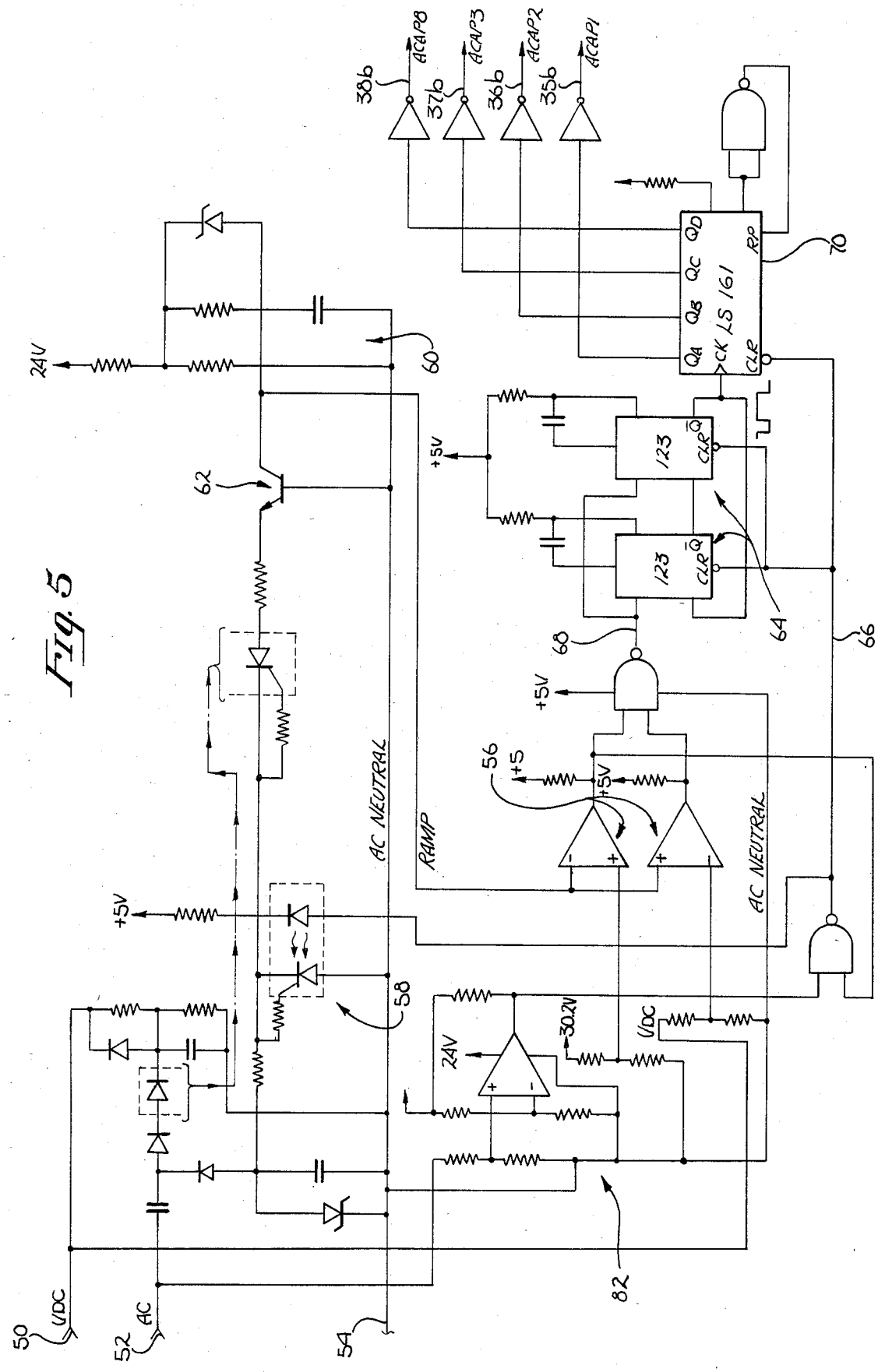
FIG. 5 is an electrical schematic of a control means which may be used for the circuit of FIG. 3.

The control circuit of FIG. 5 may be employed for the control means 41 shown in FIG. 3. This circuit senses both the AC potential and output DC potential to determine the number of the SCRs which are to be triggered, and hence, the number of capacitors which are to be used. It can be shown that the number of capacitors which are to be charged is proportional to:

$$C_n \alpha \frac{\Delta V_{DC}}{V_{AC} - V_{DC}}$$

where $V_{AC}$ is the peak-to-peak input AC potential. The numerator of this fraction corresponds to the "droop" which occurs between the charging half cycles. This droop is shown to some extent in FIG. 2 by line 24. The circuit of FIG. 5 implements this equation in analog form. In general, since it is difficult to divide analog signals, the numerator and denominator are represented by frequencies and these frequencies are divided. Since the circuit of FIG. 5 determines the number of capacitors to be used each cycle, considerable resetting of the logic is required. It will be apparent that circuits can be used that make a determination over several AC cycles, rather than on each cycle.

Referring more specifically now to FIG. 5, the output DC potential on capacitor 43 is coupled to line 50. The AC potential is coupled to line 52 and the AC neutral or ground line is shown as line 54. The output lines which are coupled to the SCRs 35 through 38 of FIG. 3 are shown as lines 35b through 38b, respectively in FIG. 5.

The "division" discussed above is performed within the amplifiers 56. The input to these amplifiers on pins 4 and 7 is a signal, the frequency of which is proportional to the peak-to-peak AC potential less the DC potential. This is the denominator of the fraction discussed above. This frequency dependence signal is generated by the circuit shown generally at 58 and buffered through transistor 62 and the circuit shown at 60 to provide the frequency dependent signal to the amplifier 56.

A signal, the frequency of which is proportional to $V_{CC}$ is developed by the circuit shown at 62 and the signal is provided to amplifiers 56 on pins 5 and 6. The duration of the signal on line 68 is proportional to the number of capacitors which are to be used during each cycle (actually, the conduction occurs during only a half-cycle). The bistable circuits 64, along with a clocking signal from line 66, provide resetting so that a new determination of the number of capacitors is made for each cycle. The 4-bit counter 70 provides a count on pins 11 through 14 which determine the number of capacitors to be activated. The duration of the signal on line 68, after being clocked through the bistable circuits 64, determines this count. The signal on line 66 clears this count for each cycle, allowing a new determination to be made.

Thus, an AC-DC power conversion circuit has been described which provides means for regulating the DC potential. The circuit has low power consumption and is relatively inexpensive to implement. One preferred use for the described circuit is for providing a DC potential to the primary winding of a switching power supply.

I claim:

1. An electrical circuit for receiving an AC potential and providing a regulated DC potential to a load comprising:
   a plurality of paths each including a capacitor and a silicon controlled rectifier (SCR), said paths being coupled to said AC potential;
   a filter capacitor coupled to said paths to filter the DC current from said SCRs; and,
   control means for controlling the firing of said SCRs, coupled to the control leads of said SCRs;
   whereby by selectively controlling the ones of the SCRs which are turned on, the DC potential at said filter capacitor can be regulated.

2. The circuit defined by claim 1 wherein at least some of the capacitors in said paths have different capacitance so as to permit finer regulation of said DC potential.

3. The circuit defined by claim 1 wherein diodes are coupled to said SCRs and input capacitors to form a voltage doubler rectifier.

4. The circuit defined by claim 1 or claim 3 wherein inductors are included in series with said capacitors in each of said paths.

* * * * *

UNITED STATES PATENT AND TRADEMARK OFFICE
CERTIFICATE OF CORRECTION

PATENT NO. : 4,600,982

DATED : 7/15/86

INVENTOR(S) : Graham

It is certified that error appears in the above-identified patent and that said Letters Patent is hereby corrected as shown below:

| COLUMN | LINE | DESCRIPTION |
|---|---|---|
| 02 | 67 | Delete "zero" insert --infinite-- |
| 03 | 01 | Delete "infinite" insert --zero-- |

Signed and Sealed this

Fifth Day of June, 1990

Attest:

HARRY F. MANBECK, JR.

*Attesting Officer*      *Commissioner of Patents and Trademarks*